United States Patent [19]

Miller

[11] 3,758,873

[45] Sept. 11, 1973

[54] RANDOM PULSE GENERATOR

[75] Inventor: Herbert E. Miller, Brookline, Mass.

[73] Assignee: Epsco Incorporated, Westwood, Mass.

[22] Filed: July 14, 1972

[21] Appl. No.: 271,704

[52] U.S. Cl. .................................. 331/78, 328/158
[51] Int. Cl. .......................................... H03b 29/00
[58] Field of Search ........................ 331/78; 328/158

[56] References Cited

UNITED STATES PATENTS 3,573,652 4/1971 Charters .............................. 331/78

*Primary Examiner*—John Kominski
*Attorney*—Joseph Weingarten, Stanley M. Schurgin et al.

[57] ABSTRACT

A system for generating electronic pulses separated by intervals which vary according to a predetermined probability distribution, typically exponential. The predetermined probability distribution is realized through the interaction of two other separately controlled functions. A first probability function statistically governs the selection of a first value and a second time varying function establishes the pulse time interval by relation to the selected first value.

8 Claims, 3 Drawing Figures

RANDOM PULSE GENERATOR

FIELD OF THE INVENTION

This invention relates to pulse generators and in particular to a random pulse generator for providing a sequence of pulses at intervals which are statistically governed by a decaying exponential probability distribution.

BACKGROUND OF THE INVENTION

While a sequence of electrical signals may appear to have a random occurrence, a sufficiently large sample of the pulse sequence, particularly if it is ergotic, can be statistically analyzed to determine the distribution of pulse intervals and thereby define the pulse sequence according to its probability distribution. This statistical proposition permits one pulse sequence having one probability distribution to be distinguished from another pulse sequence with a different probability distribution.

Systems employing this statistical theory commonly require the generation of a pulse sequence where the pulse interval is governed by an established probability distribution, typically an exponential decay. Generators of this sort are known and have commonly included a noise generator for producing a random amplitude signal and a comparator for detecting each traversal of a preset threshold level by the random amplitude signal. Each detected traversal results in the generation of a pulse and over time a sequence of pulses is produced with approximately the desired exponential distribution. In addition to the theoretical inaccuracy of this technique a further drawback is the difficulty of accurately controlling the average pulse rate determined by the level of the threshold. This difficulty may be due to temperature sensitivity in the threshold comparison system as well as interference from other sources where the interference has a probability distribution distinct from that of the generated noise. Frequency demands are also placed on the noise generator to provide the necessary wideband noise signal.

BRIEF SUMMARY OF THE PREFERRED EMBODIMENT

In a preferred embodiment for applicant's invention on the other hand two predetermined signal level distributions interact in a manner that provides a real time sequence of pulses at intervals governed by a desired probability distribution. The use of two separately controllable signal level distributions to produce the desired interval probability provides a more accurate and flexible random pulse generator.

While many distributions are possible, in a specific example for the present invention the pulse interval is to be governed by an exponential decay distribution. A random amplitude generator is provided to produce a constant signal amplitude in response to a trigger signal. The probability for the generation of all amplitude levels is equal, making the probability distribution a constant. The trigger signal also initiates an exponential decay signal from a further generator and the randomly generated constant amplitude and decaying amplitude signals are applied to a comparator to detect equality therebetween. Detected equality causes the generation of each pulse in the sequence and also produces the trigger signal which causes the process to be repeated for the production of the sequence of output pulses.

To provide accurate control over the average interval between pulses, a feedback circuit is provided to detect the average interval and to adjust the exponential decay rate so as to maintain a preselected average pulse interval.

DESCRIPTION OF THE DRAWINGS

These and other features of the invention can be more fully understood from the detailed description of a preferred embodiment presented below for purposes of illustration, and not by way of limitation, and from the accompanying drawings of which.

DETAILED DESCRIPTION OF THE PREFERRED EMBODIMENT

Figure 1:
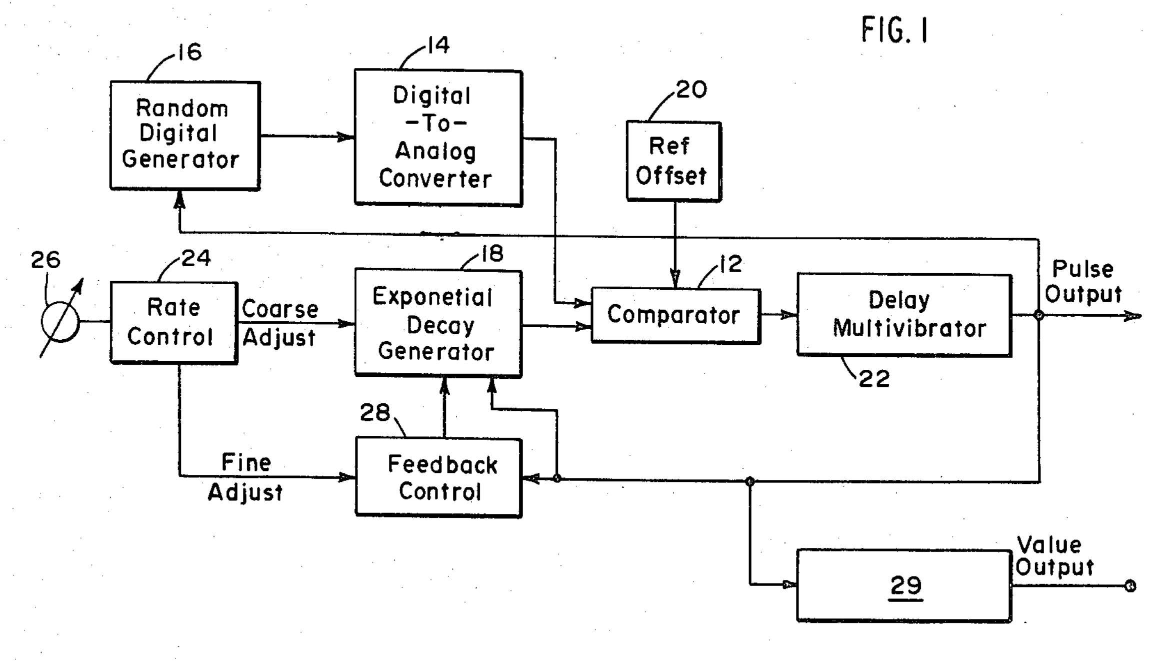
FIG. 1 is a block diagram of a system according to the invention.

With reference to FIG. 1 the basic principles of operation of the generator according to the invention to provide an exponential decay distribution can be seen to reside in comparing the output of a random signal generator with the output of an exponential decay generator. To this end, a comparator 12 receives an analog signal from a digital-to-analog converter 14 which responds to the digital signals of a random digital signal generator 16. The generator 16 responds to a reset signal to produce a random digital number which in turn is converted to a random amplitude level by converter 14. The probabilities of occurrence for all random digital numbers within a range are equal thus providing a constant probability distribution for the amplitude output of converter 14 within the corresponding range. The comparator 12 also responds to an exponential decay signal from a generator 18. The exponential decay signal is reinitiated in response to each occurrence of a reset signal. The comparator 12 may be provided with a predetermined offset from a reference offset 20 for purposes to be explained below. The comparator 12 detects the equality between its inputs from the converter 14 and generator 18. The detected equality triggers a delay multivibrator 22 commonly called a "one-shot" circuit to produce the pulse output. The delay multivibrator 22 is operative to respond only to one slope in the output from comparator 12 so that the pulse is generated only during decay portions of the generator 18 and not reset portions.

The reset signals for the generators 16 and 18 are provided from the multivibrator pulse output and in the case of the random digital generator 16 causes the generation of a new, random digital signal. The reset signal in the case of the exponential decay generator 18 reinstates the exponential decay from a predetermined initial level. This initial level is chosen to be greater than the largest magnitude possible at the output of the digital-to-analog converter 14 to insure that the exponential decay will always start from above the constant amplitude signal. For similar reasons, the offset reference 20 is provided to the comparator 12 to insure that the exponential decay will, in a finite time, traverse the lowest possible level from the digital-to-analog converter 14. An optional approach is to cause the digital-to-analog converter 14 to respond to only the most significant bits from the random digital generator 16 leaving one or more least significant bits to define a predetermined minimum value for the output of the converter 14.

The average pulse interval is selectable by a rate control 24 in response to a selector 26. A coarse rate adjust signal is applied therefrom to the exponential decay generator 18 while a finer resolution rate control signal is applied to a feedback controller 28. The feedback controller 28 also responds to the pulse output from the multivibrator 22 to compare the selected average interval to a detected actual average interval and to provide a feedback adjustment to the exponential decay generator 18 to produce a change in decay rate and correspondingly a regulation of the average pulse interval to the selected length.

Figure 2:
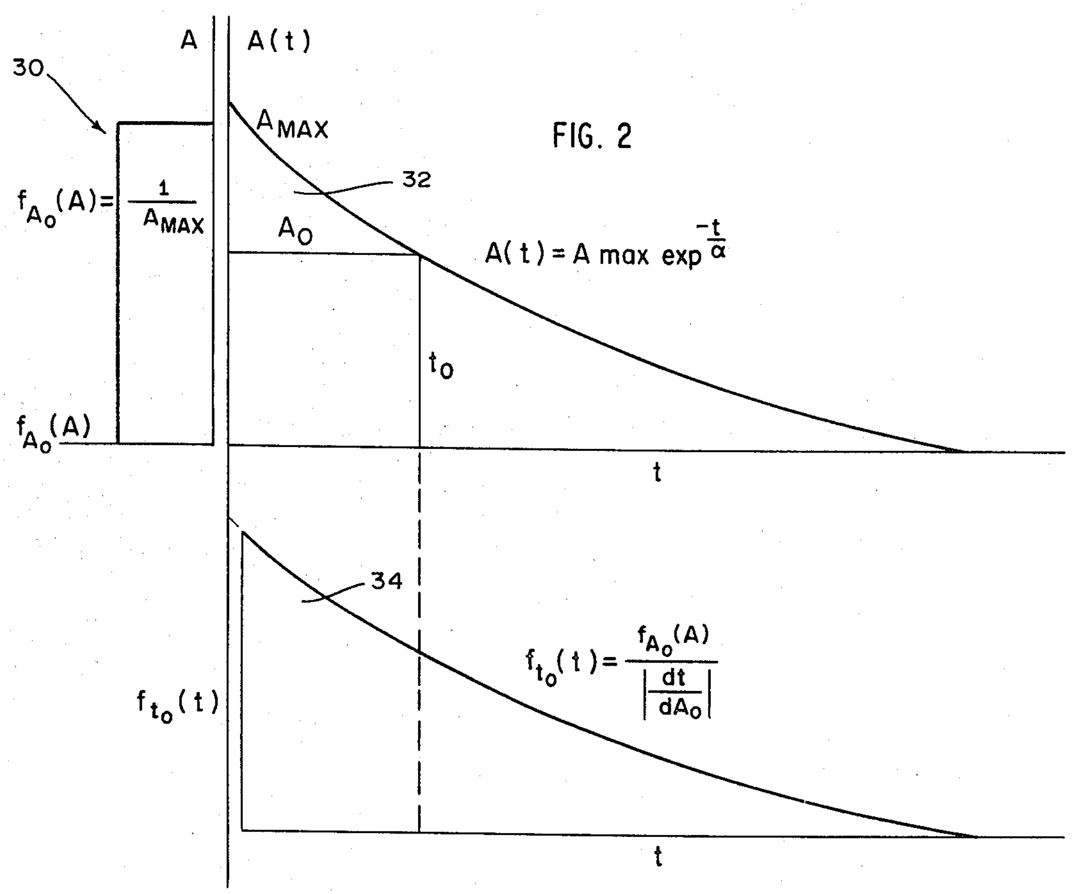
FIG. 2 is a probability distribution chart useful in understanding the invention.

By reference to FIG. 2 the interraction of two signal level distributions to produce the ultimately desired randomness in the output pulse interval can be more fully understood. In FIG. 2, a graph 30 corresponds to the probability function governing the signal amplitude from the converter 14 while a graph 32 indicates the exponential decay signal level variation with time which is provided by the exponential decay generator 18. These two graphs 30 and 32 are placed adjacent to each other so that each has in common a vertical axis representing amplitude as applied to the comparator 12. The exponential decay graph 32 has the right hand horizontal axis represent time, and the random signal level graph 30 has its left hand horizontal axis represent probability of occurrence of the amplitudes from the converter 14.

The coaction of the curves 30 and 32 to result in the probability function 34 can be expressed mathematically using known statistical theory, see for example A. Papoulis, *Probability, Random Variables, and Stochastic Processes*, McGraw Hill, 1965, p. 126 et seq. In the general case for a curve like 32, A and $t$ are related by the function $$A = A(t) \tag{1}$$

The probability of $t$ lying in the range $t_o$ to $t_o + \Delta t$ can be considered as the same as the probability of A lying in the range $A_o$ to $A_o + \Delta A$ where $\Delta A$ is determined from $\Delta t$ at $t_o$ by the relationship $$A = A(t)$$

In the limit where $\Delta t$ becomes $dt$ and $\Delta A$ becomes $dA$, the probability, $f_{t_o}(t)dt$, of $t$ being between $t_o$ and $t_o + dt$ is the same as the probability, $f_{A_o}(A)|dA_o|$, of A being between $A_o$ and $A_o+\Delta A$, or $$f_{t_o}(t)dt = f_{A_o}(A)\,|dA_o| \tag{2}$$

then, $$f_{t_o}(t) = f_{A_o}(A)\left|\frac{dA_o}{dt}\right| \quad \text{or} \tag{3}$$

$$f_{t_o}(t) = \frac{f_{A_o}(A)}{\left|\frac{dt}{dA_o}\right|}$$

$f_{A_o}(A)$ is determined from the known probability function represented by curve 30 and $|dt/dA_o|$ is found from the second function $A = A(t)$ represented by curve 32.

Equations (1), (2), and (3) indicate the manner in which two signal level distributions, $f_{A_o}(A)$ and $A(t)$, the functions governing the operation of generators 16 and 18 respectively, coact to produce the resultant output interval probability distribution, in this case an exponential decay function. These equations also indicate the flexibility of the system in producing a variety of desired output interval distributions by permitting adjustment of the generators 16 and 18 to achieve that result. For example, if a constant distribution is desired within a predetermined interval range, the generator 18 can be designed to provide a constant slope ramp.

It can be now appreciated that pulse interval probability distributions which are difficult or impossible to realize in a random pulse generator of conventional design may, according to the implementation of the present invention, be more simply and accurately realized as the coaction of two separate functions. While the ultimately desired probability distribution provides a restraint on the generator output, the two separate functions utilized to produce the ultimate distribution are not in general uniquely restrained and several different sets of the two functions may be employed. The random pulse generator designer may thus not only choose a set which can be practically implemented electronically, but one which satisfies accuracy or other conditions for the ultimate distribution. Moreover, complex distributions may be implemented by, for example, a multiple root function for generator 18 such as a damped sinusoid. Additionally while the ultimate probability distribution of the present implementation governs a pulse interval, the invention may also be employed to generate values other than time for the ultimately desired distribution as for example by using a time to signal level converter 29.

Figure 3:
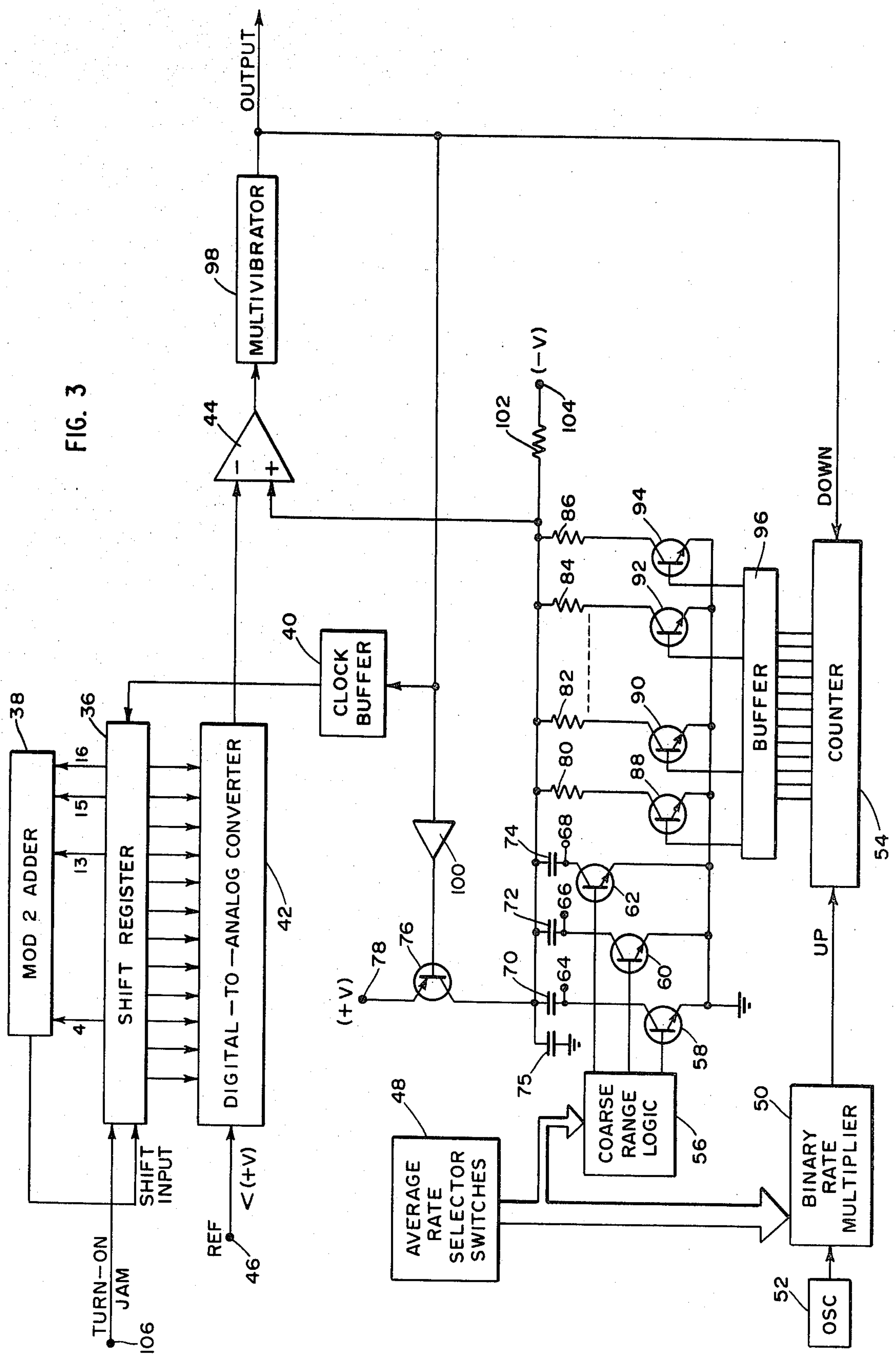
FIG. 3 is a schematic diagram of a random pulse generator according to the invention.

To more specifically indicate the design of the generator to accomplish this exponential decay distribution for the pulse intervals, reference is made to FIG. 3. The constant probability distribution for a bounded digital magnitude as provided by the generator 16 is shown in FIG. 3 as being produced by a 16 bit shift register 36 which receives at its input the bit output of a Modulo 2 adder 38. Modulo 2 adders are known in the art and essentially operate to produce a binary one output if the number of binary 1 inputs is odd. To provide randomness in the digital contents of the register 36 the Modulo 2 adder 38 responds to the digital states of the fourth, thirteenth, fifteenth, and sixteenth bits of shift register 36. The register 36 shifts in the signal from the adder 38 and shifts each bit one position in response to a clock input from a clock buffer 40. A digital-to-analog converter 42 responds to the 12 most significant bits in the 16 bit shift register 36 to provide a corresponding analog output signal for application to a comparator, high gain differential amplifier 44. The digital-to-analog converter 42 receives a reference input from a voltage source 46.

The exponential decay is provided under the control of an average rate selector switch system 48 which provides a multi-bit digital output to a binary rate multiplier 50. The selected average rate can typically range from zero to ten thousand pulses per second. The binary rate multiplier responds to a predetermined high impulse rate from stable oscillator 52 to produce an output pulse rate having an average interval specified by the selection in the switch system 48 as is known in the art. This selected average rate pulse stream is supplied from the binary rate multiplier 50 to an up-down counter 54 on a count-up input. Oscillator 52 provides the systm time reference and accordingly its stability is defined by required system time accuracy.

The binary rate selector output is also applied to a coarse range logic circuit 56 which may be a series of gates for detecting in which of four predetermined portions of the range of selectable average rates is the selected rate. The logic 56 has three outputs corresponding to all but one portion of the range and these are respectively applied to the bases of grounded-emitter NPN transistors 58, 60 and 62. The collectors of these transistors are respectively biased through sources 64, 66 and 68 and are further connected to respective capacitors 70, 72 and 74. Opposite terminals of the capacitors 70, 72 and 74 are joined in common to a capacitor 75 which is permanently grounded and the common point is applied to a differential noninverting input of the high gain comparison amplifier 44.

According to the range for the selected average rate, one or more of the capacitors 70, 72 and 74 is enabled for charging through its corresponding transistor. Charging is provided by current through the emitter-collector circuit of a PNP transistor 76 from a source 78 coincident with each pulse output as will be explained. Capacitor 75 is permanently connected for charging with each pulse to establish the fourth range portion. Discharging of the one or more charging capacitors is through one or more of a plurality of resistors 80, 82, 84 and 86, also connected to the noninverting input of the comparison amplifier 44. These resistors are selectively grounded through grounded-emitter NPN transistors 88, 90, 92 and 94. Transistors 88, 90, 92 and 94 may be operated in the grounded collector mode for better switching. The bases of these transistors 88, 90, 92 and 94 are controlled by a buffer amplifier system 96 which responds to respective digital states of the up-down counter 54. While only four stages of resistor and transistor discharge circuits for the capacitors 70, 72 and 74 have been shown it is to be understood that a greater number may be used depending upon the accuracy desired in the fine control of the average pulse interval.

At the point where the decaying signal applied to the noninverting input of the amplifier 44 reaches the level of the constant input applied from the converter 42 to the inverting input of the amplifier 44, the amplifier 44 rapidly changes its output from a high to a low value and this negative slope transition triggers a delay multivibrator 98 to generate an output pulse. The resulting pulse is applied to the clock buffer 40 to provide the clock signal to the shift register 36 causing it to cycle one bit and assume a new random number and is also applied to a buffer amplifier 100 for driving the base of the PNP charging transistor 76 for a sufficient duration to charge one or more of the capacitors 70, 72, 74 and 75 to the voltage of the source 78. The pulse output from the multivibrator 98 is also applied to a count-down input of the counter 54 and causes the digital magnitude therein to decrease one bit.

The resulting control over the discharge rate through the resistors 80, 82, 84 and 86 by the counter 54 results in regulation of the average pulse interval to the rate selected by the switch system 48. Thus if the average rate is too low the counter 54 will increase its count and correspondingly increase the discharge rate through resistors 80, 82, 84 and 86 to reduce the average pulse interval until equilibrium is achieved. The resistors 80, 82, 84 and 86 increase in resistance by a factor of two, the greatest resistance corresponding to the least significant bit in the counter 54.

To insure that the exponential decay signal applied to the noninverting input of the amplifier 44 will traverse all possible digital magnitudes applied in analog form to the inverting input, the reference voltage 78 is made slightly larger than the reference voltage 46. This insures that the initial value for the exponential decay will be larger than the highest value that the digital-to-analog converter 42 is capable of producing. Similarly, a high value resistor 102 is connected to a negative source 104 from the noninverting input of the amplifier 44 to insure that the exponential decay traverses the lowest possible signal level from the converter 42, in this case by ultimately becoming negative.

In order to insure that the shift register 36, operating in a feedback loop through the modulo 2 adder 38, produces a random state, a turn-on jam signal 106 is applied to the register 36 to insure at least one high level bit is contained in the register at turn-on.

As can be seen from the detailed description in FIG. 3, the random pulse generator provides a simple and easily controlled means of generating a random pulse signal with an exponential decay distribution to the pulse intervals without the need for employing a noise or other erratic, and continuously operating, signal source. A feedback control system provides precise regulation of the average pulse rate to a predetermined average rate. It can also be appreciated by those skilled in the art that instead of the constant probability distribution provided by the shift register 36 a number of other distributions, implemented by known digital techniques, can be employed to achieve a different distribution, $f_{A0}(A)$, for use in the system. Similarly, different analog or digital implementations of the decay or, optionally, increasing signal used for comparison purposes can be implemented and according to the equations indicated above will produce a different probability distribution for the output pulse interval.

It will thus occur to those skilled in the art that alterations and modifications can be made to the specific probability functions as well as circuitry employed in the invention depending upon their individual requirements. It is accordingly intended to limit the scope of the invention only as indicated in the following claims.

What is claimed is:

1. A system for producing a sequence of values with each value governed by a predetermined probability, said system comprising:

means for repeatedly selecting a signal level from within a range of signal levels according to a preset probability function;

means for providing a transformation between a first range of signal values and a second range of signal values whereby each signal value in said first range produces one or more corresponding signal values in said second range;

means responsive to each selected signal level and operatively associated with said transformation providing means for detecting from said transformation providing means a signal value in said second range corresponding to the signal value in said first range represented by each said selected signal level;

a plurality of said output signal values from repeated selections of one of said signal levels providing said sequence of values according to the predetermined probability;

said predetermined probability being determined by coaction of the functions describing the selections of said signal level selecting means and the transformations of said transformation providing means.

2. The system of claim 1 wherein:

said transformation providing means includes means for generating the values in said first range as a function of time within said second range;

said detecting means includes means for comparing said values in said first range with said selected signal level to determine equality therebetween; and means responsive to a determination of equality for providing a time interval corresponding to the time represented by said generating means at said determined equality.

3. The system of claim 1 wherein said signal level selecting means includes:

a random signal generator; and means for providing each random signal over a range extending within said first range of values.

4. The system of claim 1 further including:

means for selecting an average value for said sequence of values; and means responsive to the selected average value and said plurality of output values for regulating the average value of the output values detected from said transformation providing means.

5. The system of claim 1 wherein said transformation providing means includes means for providing a plurality of signal values in said second range corresponding to the signal value in said first range representing the signal level selected.

6. A pulse generator for producing a sequence of electrical output pulses at intervals governed by a predetermined probability distribution, said pulse generator comprising:

means responsive to a first signal for producing a signal amplitude within a range of amplitudes, said produced signal amplitude being governed by a predetermined probability function;

means operative in response to said first signal for generating a predetermined signal waveform as a function of time;

means for comparing said produced signal amplitude and said generated signal waveform and operative to produce a timing signal in response to a predetermined coincidence between said produced signal amplitude and said predetermined waveform;

means operative in response to said timing signal for producing one of said sequence of output pulses; and means further operative in response to said timing signal for producing said first signal for application respectively to said signal amplitude producing means and said signal waveform generating means to provide recycling thereof in order to permit production of a sequence of output pulses.

7. The pulse generator of claim 6 further including:

means responsive to said sequence of output pulses for providing a signal representative of the actual average interval between pulses in the pulse output sequence;

means for providing selection of an average interval between pulses; and means for adjusting said predetermined waveform signal generating means in response to the selected average interval and the actual average interval signal to cause said actual average interval between pulses to approach said selected average interval.

8. A pulse generator for producing output pulses at intervals varying according to a predetermined probability distribution, said generator including:

a shift register operative to shift digital signals therein in response to a clock signal;

means for applying a digital input to said shift register as a predetermined combination of a plurality of the binary states of said shift register;

means for converting the binary states of said shift register to an analog signal representing the magnitude of said binary states;

means for selecting an average pulse interval;

means operative in response to said selected average pulse interval for producing a pulse sequence at a corresponding pulse rate;

a plurality of capacitors;

a plurality of resistors operative to discharge said plurality of capacitors;

means for charging said plurality of capacitors to a predetermined signal level in response to an output pulse;

means operative in response to predetermined ranges in said selected average pulse interval for selectively connecting said plurality of capacitors for discharge through said plurality of resistors;

means for accummulating a digital representation of the difference in rate of pulse occurrence between pulses in said pulse sequence and said output pulses;

means operative in response to each bit of said digital representation for selectively enabling a corresponding one of said plurality of resistors as a discharge path for said plurality of capacitors;

means responsive to said first signal for generating said clock signal for said shift register;

means for comparing the voltage level of said plurality of capacitors during discharge by said plurality of resistors with said analog signal to produce a comparison signal in response to detection of a predetermined relation therebetween; and means for producing one of said output pulses in response to each said comparison signal.

* * * * *